UNITED STATES PATENT OFFICE.

JOHN C. WALKER, OF YONKERS, NEW YORK.

MAKING AN ALLOY OF FERROMANGANESE AND SILICON.

1,109,640.  Specification of Letters Patent.  Patented Sept. 1, 1914.

No Drawing.  Application filed February 4, 1913. Serial No. 746,187.

*To all whom it may concern:*

Be it known that I, JOHN C. WALKER, a citizen of the United States, residing in the city of Yonkers, State of New York, have invented new and useful Improvements in Making an Alloy of Ferromanganese and Silicon, of which the following is a specification.

In the finishing operation of making or refining steel it is customary to add manganese in the commercial form of ferro-manganese. Part of this addition is taken up in extracting oxygen from the steel and a part of the manganese remains to alloy with the steel and thereby to materially improve its quality for most purposes. It is customary to add with the manganese a small quantity of silicon in the commercial form of ferro-silicon. The silicon has a greater affinity for oxygen than manganese and the use of a small quantity of silicon relieves a comparatively large quantity of manganese of its function as a deoxidizer and leaves it free to alloy with the steel. Ferro-silicon is more expensive than ferro-manganese and is so expensive that the cost of these additions is very substantial. This is especially the case where ferro-silicon of high purity is required. It has been found that steel of better quality is obtained with a smaller waste of ferro-manganese when the ferro-manganese is added in a molten condition.

According to this invention, molten ferro-manganese is provided alloyed with a small proportion of silicon in the purest form and at a cost materially below that of silicon in the commercial form of ferro-silicon.

The process is best carried out in an electric furnace of the Heroult arc type. In such a furnace ferro-manganese is melted and maintained in a molten condition alloyed with a small amount of silicon, being tapped off and replenished from time to time as needed by the steel making furnaces. Instead of replenishing the pool with ferro-silicon, however, I replenish and maintain a slag containing a high percentage of silicon and sufficient carbon or other reducing agent (as aluminium, calcium, &c.) to reduce the silica and to provide pure nascent silicon which alloys with the ferro-manganese in the pool. Reducing conditions are maintained so that there is no chance of reoxidation of the silicon.

The following is a specific example, supposing that the steel-making furnaces require additions of one-thousand (1,000) pounds of the alloy ferro-silico-manganese per hour. The ferro-manganese melting furnace may contain 9,500 pounds of ferro-manganese alloyed with 500 pounds of silicon. At the end of the first hour, one-thousand pounds of ferro-silico-manganese are taken out. This leaves 9,000 pounds of an alloy composed approximately as follows:—6,840 pounds of manganese, 1,710 pounds of iron, and 450 pounds of silicon. The slag at this time comprises 200 pounds of lime, 100 pounds of silica, and certain small remaining proportions of coke dust and fluor-spar. We now replenish the ferro-manganese by adding 950 pounds of the same. The silicon is replenished by adding 100 pounds of sand and 50 pounds of coke dust and 10 pounds of fluor-spar to the slag. During the succeeding hour 50 pounds of silicon are reduced from the slag so as to make up the deficiency, and the slag will thereby be reduced to the due proportions above stated as existing at the end of the first hour. Further withdrawals of the mixture and replenishing thereof are effected in the same way.

In most plants the practice will be to require withdrawals of the ferro-silico-manganese at more frequent intervals and in correspondingly smaller quantities than in the above example. In such cases the ferro-silico-manganese will be replenished more frequently and the quantities necessary for replenishing the pool will be proportionately diminished. A certain amount of time is necessary to heat and melt the additions of sand and coke dust and ferro-manganese; therefore, where frequent withdrawals and replenishings are necessary it may be advisable to employ two or more furnaces working in the manner above described so as to be able to give each furnace a longer rest between additions and withdrawals than would be the case if only one furnace were employed.

What I claim is—

1. In the making of ferro-silico-manganese the process which consists in melting ferro-manganese and producing nascent silicon in the presence of the molten ferro-manganese and causing the silicon as it is produced to combine with the ferro-manganese.

2. In the making of ferro-silico-manganese the process which consists in melting ferro-manganese and reducing silica to silicon in the presence of the molten ferro-manganese and maintaining non-oxidizing conditions so as to prevent reoxidation of the silicon and to cause it to combine in nascent condition with the ferro-manganese.

3. In the making of ferro-silico-manganese the process which consists in providing a pool of ferro-silico-manganese withdrawing portions thereof from time to time and replenishing the same by the addition of ferro-manganese to the pool and the addition of silica and a reducing agent to the slag and heating the same to reduce the silica to silicon, and maintaining non-oxidizing conditions to prevent reoxidation of the silicon and to cause it to combine in nascent condition with the metal of the pool.

4. In the making of ferro-silico-manganese the process which consists in providing a pool of ferro-silico-manganese, withdrawing portions thereof from time to time and replenishing the same by the addition of ferro-manganese to the pool and the addition of silica a reducing agent to the slag, and furnishing sufficient heat to reduce the silica to silicon, and maintaining a non-oxidizing atmosphere so as to prevent reoxidation of the silicon and to cause it to combine in nascent condition with the metal of the pool.

In witness whereof, I have hereunto signed my name in the presence of two subscribing witnesses.

JOHN C. WALKER.

Witnesses:
D. ANTHONY USINA,
LULU STUBENVOLL.